No. 651,706.  
W. H. FORBES.  
RATCHET DRIVING GEAR.  
(Application filed Jan. 24, 1900.)

Patented June 12, 1900.

(No Model.)

Witnesses.  
Robert Everett  
J. B. Keefer

Inventor.  
Wilson H. Forbes,  
By James L. Norris,  
Atty.

THE NORRIS PETERS CO., PHOTO-LITHO., WASHINGTON, D. C.

UNITED STATES PATENT OFFICE.

WILSON H. FORBES, OF BEAVER FALLS, PENNSYLVANIA.

RATCHET DRIVING-GEAR.

SPECIFICATION forming part of Letters Patent No. 651,706, dated June 12, 1900.

Application filed January 24, 1900. Serial No. 2,660. (No model.)

*To all whom it may concern:*

Be it known that I, WILSON H. FORBES, a citizen of the United States, residing at Beaver Falls, in the county of Beaver and State of Pennsylvania, have invented new and useful Improvements in Ratchet Driving-Gears, of which the following is a specification.

This invention relates to a ratchet driving-gear, and has for its object to provide a driving-gear of the character referred to wherein the parts will always be in position to instantaneously effect an operative engagement with one another to drive the mechanism to which the gear may be applied and which when driven in the reverse direction will operate with the minimum amount of noise and friction.

To this end my invention consists in the features, and in the construction, combination, and arrangement of parts hereinafter described, and particularly pointed out in the claims following the description, reference being had to the accompanying drawings, forming a part of this specification, wherein—

Figure 1:
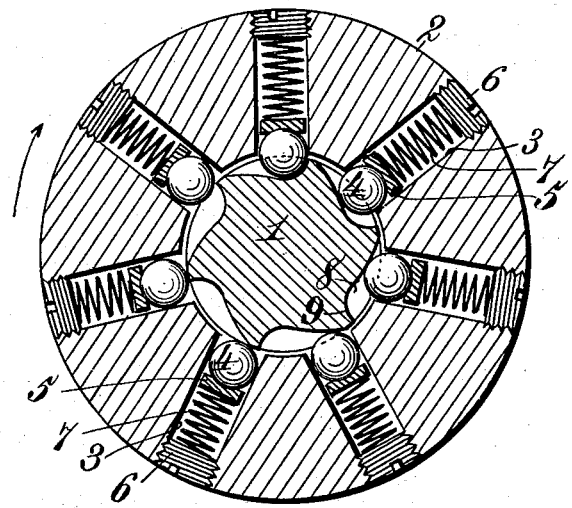
Figure 2:
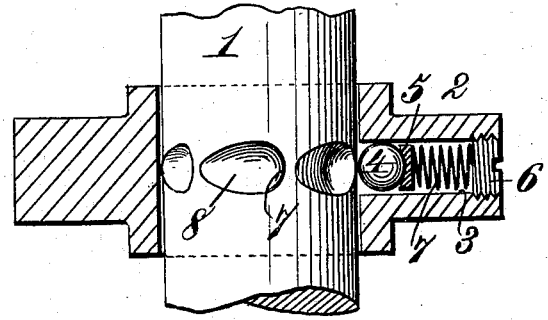

Figure 1 is a vertical central sectional view of my improved ratchet driving-gear; and Fig. 2 is a transverse sectional view, the shaft being shown in plan.

Referring to the drawings, the numeral 1 indicates a shaft or axle on which is loosely mounted a drive-wheel 2. The drive-wheel is shown in the present instance as being formed solid and provided with a plurality of equally-spaced radial sockets 3, extending from the periphery of the wheel to its inner circumference. Arranged in each of the sockets 3 is an antifriction-ball 4, on which is arranged to bear a washer 5. Plugs 6 are screwed into the outer ends of the sockets 3, and between said plugs and washers are disposed coiled springs 7, that operate to force the balls inward and hold them in contact with the shaft or axle 1.

Formed in the periphery of the shaft or axle 1 is an annular series of notches or recesses 8, each of said notches being wider and deeper at one end than at the other, as shown, the wider and deeper end thereof forming an abrupt shoulder 9 and the narrower end gradually inclining outward and merging into the periphery of the shaft or axle. As shown, the sockets or recesses 8 are formed in an annular circumferential series about the shaft or axle and are all disposed in the same direction.

Let it be assumed that the wheel 2 is a driven wheel designed for communicating rotary movement to the shaft or axle, then the operation of the device will be as follows: It will be noted that the antifriction-balls and notches are unequal in number, seven balls being shown in the present arrangement and six notches or recesses. If the wheel be rotated in the reverse direction to that shown by the arrow in Fig. 1 of the drawings, then no motion will be communicated to the shaft, as the balls will successively drop into and roll out of the notches or recesses, and owing to the balls exceeding the notches or recesses in number when one ball is completely seated in one of the notches or recesses the succeeding ball will be moving out of its notch or recess, the next succeeding ball will be still farther moved out of its notch or recess, and so on throughout the entire series. Practically, then, there will at all times be one ball completely seated in one of the notches or recesses, while the other balls in the order of their succession will be less and less deeply seated in the recesses or sockets. As the wheel rotates the balls successively seat themselves in the sockets one at a time and then move out therefrom, so that in each complete revolution of the wheel each ball will seat itself once in each socket. Thus in the instance herein shown the balls collectively will seat themselves in and move out of the notches or recesses forty-two times. During this movement the wheel will rotate idly around the shaft or axle without communicating movement to the latter. If the wheel be rotated in the reverse direction, as indicated in Fig. 1 of the drawings, one of the balls being completely seated in one of the notches or recesses and bearing against the abrupt shoulder 9, the wheel and shaft or axle will rotate together.

I have shown and described the wheel as being a driven wheel and operating to drive the shaft or axle; but it will be manifest that the power may be applied to drive the shaft or axle, so that the latter in turn will communicate motion to the wheel.

In the drawings I have shown seven balls and six notches or recesses; but it will be understood that the number of balls and notches or recesses may be varied to suit different-sized wheels and shafts or axles; but the relative number of balls and notches or recesses should always be unequal for the reasons before set forth.

The invention is herein shown and described as being applied to a shaft or axle; but it will be understood that it may be applied to a large variety of uses and is especially applicable to ratchet drills, bits, and other tools, but may be used whenever a ratchet-gear is useful or desirable. It will be understood, therefore, that where the word "shaft" or "axle" is employed I mean to include any rotatable part which the ratchet mechanism may be applied to.

Having described my invention, what I claim is—

1. The combination with a shaft or axle provided with a circumferential series of notches or recesses each of which is deeper and wider at one end than at the other, of a wheel loosely journaled on said shaft or axle, a series of radially-movable antifriction-balls carried by said wheel and arranged to engage said notches or recesses, said balls and notches or recesses being unequal in number, substantially as described.

2. The combination with a shaft or axle provided with a circumferential series of notches or recesses each of which is deeper and wider at one end than at the other, of a wheel loosely journaled on said shaft or axle and provided with a plurality of radial sockets, antifriction-balls disposed in said sockets and arranged to engage the notches or recesses, and springs disposed in the sockets and operating to hold the balls in contact with the shaft or axle, substantially as described.

In testimony whereof I have hereunto set my hand in presence of two subscribing witnesses.

WILSON H. FORBES.

Witnesses:
JOHN REEVES,
JAMES F. MERRIMAN.